US011892147B1

(12) United States Patent
Jing et al.

(10) Patent No.: US 11,892,147 B1
(45) Date of Patent: Feb. 6, 2024

(54) SPLICED LAMP

(71) Applicant: ZHENGZHOU DEWENWILS NETWORK TECHNOLOGY CO., LTD., Henan (CN)

(72) Inventors: Yafei Jing, Henan (CN); Yahui Fu, Henan (CN); Gaohui Yang, Henan (CN); Yongchao Bai, Henan (CN)

( * ) Notice: Subject to any disclaimer, the term of this patent is extended or adjusted under 35 U.S.C. 154(b) by 0 days.

(21) Appl. No.: 18/357,411

(22) Filed: Jul. 24, 2023

(30) Foreign Application Priority Data

Jun. 2, 2023 (CN) ......................... 202321399312.5

(51) Int. Cl.
*F21V 21/12* (2006.01)
*F21S 4/28* (2016.01)
*F21V 23/06* (2006.01)

(52) U.S. Cl.
CPC ................ *F21V 21/12* (2013.01); *F21S 4/28* (2016.01); *F21V 23/06* (2013.01)

(58) Field of Classification Search
CPC ............. F21V 21/12; F21V 23/06; F21S 4/28
See application file for complete search history.

(56) References Cited

U.S. PATENT DOCUMENTS

| | | | | |
|---|---|---|---|---|
| 2006/0291220 A1* | 12/2006 | Chen | F21V 21/02 | 362/382 |
| 2011/0089390 A1* | 4/2011 | Steinkraus | E04F 11/181 | 256/65.02 |
| 2019/0120443 A1* | 4/2019 | Xia | F21S 6/002 | |

OTHER PUBLICATIONS

CN-106594562-B, Chen, May 2019 (Year: 2019).*
CN-108613065-A, Cao, Oct. 2018 (Year: 2018).*

* cited by examiner

*Primary Examiner* — Mary Ellen Bowman

(57) ABSTRACT

A spliced lamp, including a plurality of lamp posts connected in sequence. Light-transmitting covers are arranged at the sides of the lamp posts, the light-transmitting covers being fixed to the lamp posts, a circuit board being arranged in each lamp post, a light-emitting part being arranged on the circuit board, light emitted by the light-emitting part being transmitted by the light-transmitting cover, and adjacent lamp posts being connected through a connector. Before packaging and transportation, the circuit board and the light-transmitting cover are first installed on the lamp post, and then the lamp post is packaged and transported, so that the packaging space can be saved. During the packaging and transportation, an excessively long packaging box is not needed. After the transportation in place, adjacent lamp posts are connected by means of the connector, and the installation is convenient and quick.

10 Claims, 6 Drawing Sheets

SPLICED LAMP

TECHNICAL FIELD

The application relates to the technical field of lamps, and in particular to a spliced lamp.

BACKGROUND

Some lamps are usually illuminated by side light. In order to meet the lighting requirements, the lamp is generally equipped with a long lamp post. The long lamp post needs a long packaging material during transportation, and a large space needs to be occupied during the transportation, so the lamp is extremely inconvenient for packaging and transportation and prone to causing damage. Therefore, it is necessary to design a better lamp to solve the above problems.

SUMMARY

Aiming at the problems existing in a conventional art, the application provides a spliced lamp which is convenient to package and transport and is not easy to be damaged.

In order to achieve the above objective, the disclosure employs a technical solution as follows.

A spliced lamp, which includes a plurality of lamp posts connected in sequence, light-transmitting covers being arranged at the sides of the lamp posts, the light-transmitting covers being fixed to the lamp posts, a circuit board being arranged in each lamp post, a light-emitting part being arranged on the circuit board, light emitted by the light-emitting part being transmitted by the light-transmitting cover, and adjacent lamp posts being connected through a connector.

Further, the connector includes a snap ring located in the middle and a main body extending from upper and lower ends of the snap ring. The lamp post is provided with a hollow part for the main body to be inserted, the snap ring is located between the adjacent lamp posts and is flush with the edges of the lamp posts.

Further, a plurality of ribs are arranged on an outer surface of the main body in an extending direction thereof.

Further, a through groove is formed in the end, close to the snap ring, of the main body, the edge of the through groove is integrally extended to form an elastic arm, and a buckle is arranged at a free end of the elastic arm. Through holes are formed in both ends of the lamp post, and the buckles are respectively buckled in the through holes of the adjacent lamp posts.

Further, a first clamping groove and a second clamping groove are sequentially arranged at the end, away from the buckle, of the snap ring. The first clamping groove is clamped at edges of the ends of the adjacent circuit boards, and the second clamping groove is clamped at edges of the adjacent light-transmitting covers.

Further, a first groove and a second groove are formed in the lamp post. The first groove is clamped at an edge of the circuit board, and the second groove is clamped at an edge of the light-transmitting cover.

Further, the first clamping groove is aligned with the first groove, and the second clamping groove is aligned with the second groove.

Further, the first groove and the hollow part are separated by a partition plate, and a receding groove is formed in an end of the partition plate.

Further, an electrical connector is arranged at an end edge of the circuit board, and the electrical connector is located in the receding groove. When the adjacent lamp posts are spliced, the adjacent circuit boards are conducted through the electrical connector.

Further, a lamp cover is arranged at the top of the uppermost lamp post, a base is arranged at the bottom of the lowermost lamp post, a connecting post is fixed on the base, and the lowermost lamp post is clamped in the connecting post.

The beneficial effects of the application are as follows.

Before packaging and transportation, the circuit board and the light-transmitting cover are first installed on the lamp post, and then the lamp post is packaged and transported, so that the packaging space can be saved. During the packaging and transportation, the lamp post equipped with the circuit board and the light-transmitting cover, the connector, the base, the connecting post and the lamp cover are packaged separately, so that an excessively long packaging box is not needed, the occupied space is small, convenience is brought for packaging and transportation, and lamp damage is also avoided by separate packaging. After the transportation in place, adjacent lamp posts are connected by means of the connector, and the elastic buckle is buckled in the through hole of the lamp post, so that the adjacent lamp posts can be connected conveniently and quickly. Meanwhile, the first clamping groove of the connector is clamped at the end of the circuit board, and the second clamping groove is clamped at the edge of the light-transmitting cover, so that the connector can not only connect the adjacent lamp posts, but also connect the adjacent circuit boards and the adjacent light-transmitting covers, and ensure the stability of overall connection.

In the figures, 1, base; 2, lamp post; 21, through hole; 22, hollow part; 23, first groove; 24, second groove; 25, partition plate; 26, receding groove; 3, light-transmitting cover; 4, circuit board; 41, electrical connector; 5, light-emitting part; 6, connector; 61, buckle; 62, snap ring; 63, main body; 64, rib; 65, through groove; 66, elastic arm; 67, first clamping groove; 68, second clamping groove; 7, lamp cover; and 8, connecting post.

DETAILED DESCRIPTION OF THE EMBODIMENTS

The technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

It is to be noted that all directional indicators (such as up, down, left, right, front and back) in the embodiments of the application are only used to explain the relative position relationship and movement situation among components in a certain specific posture (as shown in the appended drawings). If the specific posture changes, the directional indicators will change accordingly.

Figure 1:
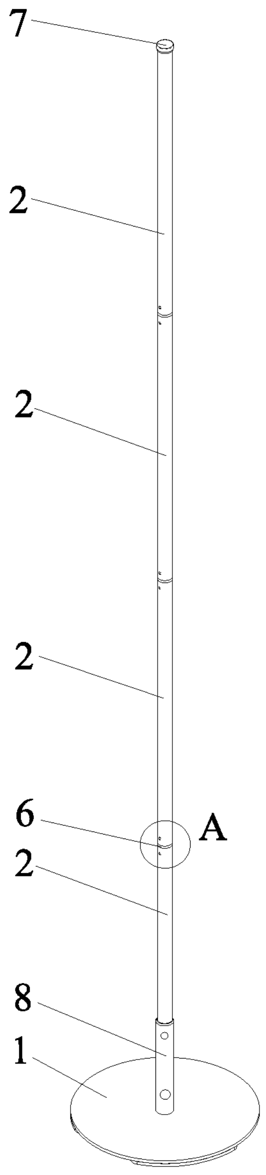
FIG. 1 is an overall schematic structural diagram of a spliced lamp in the application.
Figure 2:
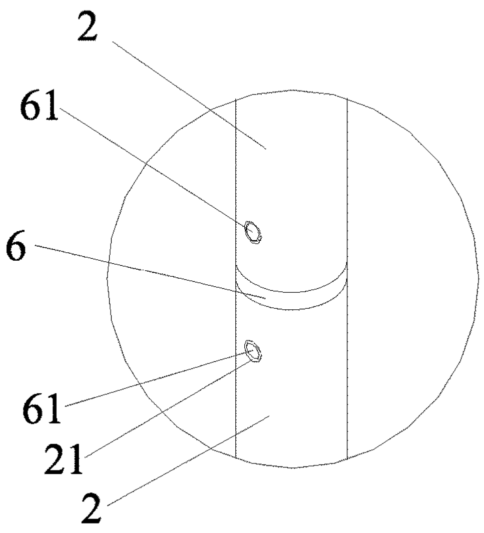
FIG. 2 is a partial enlarged diagram of part A in FIG. 1.
Figure 3:
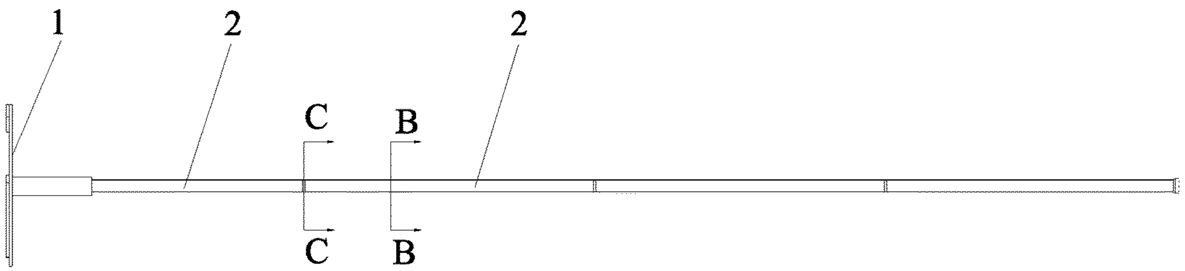
FIG. 3 is a side view of a spliced lamp in the application.
Figure 4:
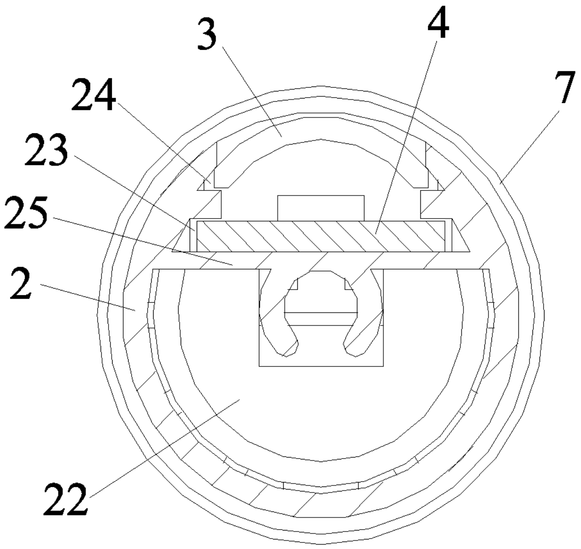
FIG. 4 is a cross-sectional view of B-B in FIG. 3.
Figure 5:
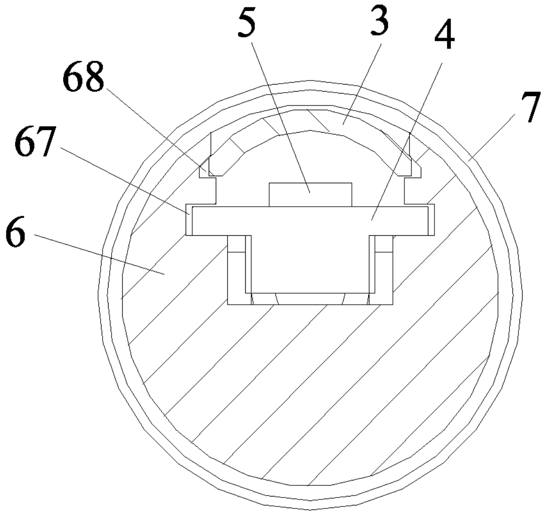
FIG. 5 is a cross-sectional view of C-C in FIG. 3.
Figure 6:
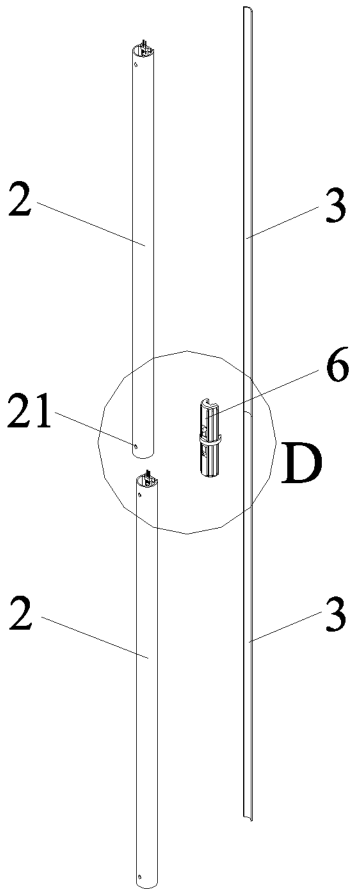
FIG. 6 is a schematic diagram of connection of two adjacent lamp posts in a spliced lamp in the application.
Figure 7:
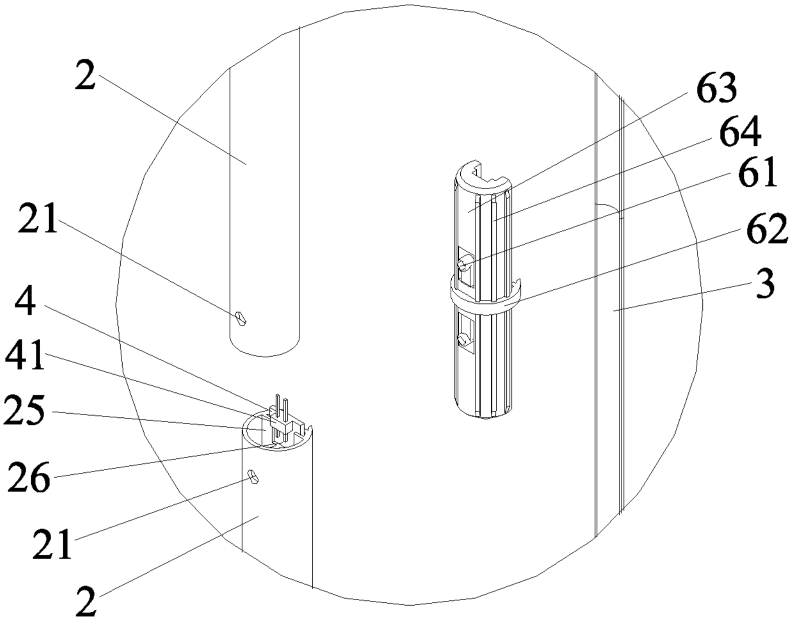
FIG. 7 is a partial enlarged diagram of part D in FIG. 6.
Figure 8:
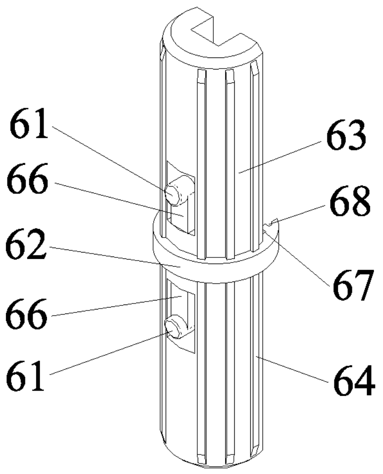
FIG. 8 is a schematic structural diagram of a connector in a spliced lamp in the application.
Figure 9:
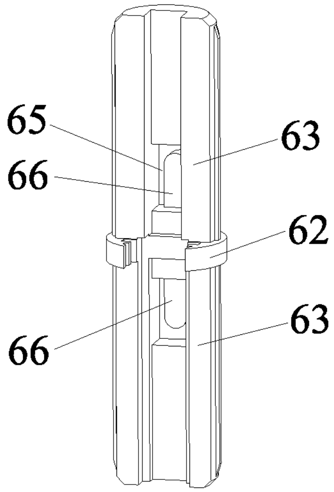
FIG. 9 is a schematic structural diagram of another angle of a connector in a spliced lamp in the application.
Figure 10:
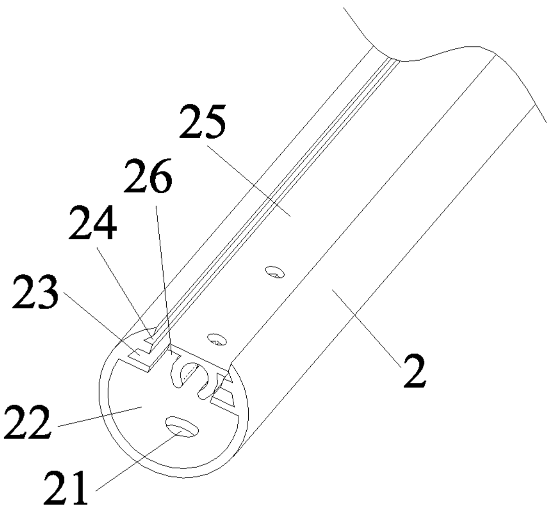
FIG. 10 is a partial schematic structural diagram of a lamp post in a spliced lamp in the application.

As shown in FIGS. 1 and 2, provided in the application is a spliced lamp, including a plurality of lamp posts 2 which are connected in sequence. The lowermost lamp post 2 is connected to a base 1, a lamp cover 7 is arranged at the top of the uppermost lamp post 2, the base 1 is arranged at the bottom of the lowermost lamp post 2, a connecting post 8 is fixed to the base 1 by means of a bolt, and the lowermost lamp post 2 is clamped in the connecting post 8.

As shown in FIGS. 3 to 7, a light-transmitting cover 3 is arranged at a side part of the lamp post 2, the light-transmitting cover 3 is fixed to the lamp post 2, and the light-transmitting cover 3 and the lamp post 2 are surrounded to form a ring shape. A circuit board 4 is arranged in each lamp post 2, a light-emitting part 5 is arranged on the circuit board 4, and light emitted by the light-emitting part 5 is transmitted by the light-transmitting cover 3. In the embodiment, the light-emitting part 5 may be Light Emitting Diode (LED) lamps installed on the circuit board 4 and uniformly arranged. Adjacent lamp posts 2 are connected by means of a connector 6. The connector 6 is provided with a buckle 61, a first clamping groove 67 and a second clamping groove 68. Through holes 21 are formed in both ends of the lamp post 2, and buckles 61 are respectively buckled in the through holes 21 of the adjacent lamp posts 2. The first clamping groove 67 is clamped at edges of the ends of the adjacent circuit boards 4, and the second clamping groove 68 is clamped at edges of the adjacent light-transmitting covers 3.

As shown in FIGS. 6 to 10, a hollow part 22, and a first groove 23 and a second groove 24 spaced from the hollow part 22 are arranged in the lamp post 2, and the hollow part 22 is arranged close to the through hole 21 for the connector 6 to be inserted, so that the buckle 61 is buckled into the through hole 21 by the hollow part 22. The first groove 23 is separated from the hollow part 22 by means of a partition plate 25, and the first groove 23 is clamped in the edge of the circuit board 4. One side of the circuit board 4 is stuck on the partition plate 25, and the other side facing the light-transmitting cover 3 is provided with the light-emitting part 5. Both side edges of the circuit board 4 are clamped in the first groove 23, so that fixing of the circuit board 4 to the lamp post 2 can be realized. The second groove 24 is clamped in the edge of the light-transmitting cover 3. The light-transmitting cover 3 is arranged in an arc shape, and both end edges thereof are clamped in the second groove 24, so that fixing of the light-transmitting cover 3 to the lamp post 2 can be realized. Before packaging and transportation, the circuit board 4 and the light-transmitting cover 3 are first installed on the lamp post 2, and then the lamp post 2 is packaged and transported, so that the packaging space can be saved.

The two ends of the circuit board 4 exceed the two ends of the lamp post 2, and an electrical connector 41 is arranged at the end edge of the circuit board 4. A receding groove 26 is formed in an end of the partition plate 25, and the electrical connector 41 is located in the receding groove 26. When the adjacent lamp posts 2 are spliced, the adjacent circuit boards 4 are conducted through the electrical connector 41.

As shown in FIGS. 6 to 9, the connector 6 includes a snap ring 62 located in the middle and a main body 63 extending from upper and lower ends of the snap ring 62. The outer periphery of the snap ring 62 is arc-shaped, located between the adjacent lamp posts 2, and flush with the edges of the lamp posts 2. The main body 63 extends upward and downward from the snap ring 62, a plurality of ribs 64 are arranged on an outer surface of the main body 63 in an extending direction thereof, and the connector 6 is clamped in the hollow part 22 by means of the ribs 64. The end of the rib 64 is provided with an inclined surface used for guiding the connector 6 to be inserted into the lamp post 2.

A through groove 65 is formed in the end, close to the snap ring 62, of the main body 63, and the edge of the through groove 65 is integrally extended to form an elastic arm 66. The buckle 61 is arranged at a free end of the elastic arm 66 and the buckle 61 protrudes toward the outside of the main body 63. When the connector 6 is inserted into the adjacent lamp posts 2, the main body 63 enters the hollow part 22, and the elastic buckle 61 slides into the through hole 21 from an inner wall of the lamp post 2 and is finally buckled into the through hole 21. At this moment, the snap ring 62 is located between the adjacent lamp posts 2 and flush with the lamp posts 2.

In the embodiment, the first clamping groove 67 and the second clamping groove 68 are arranged at the end, away from the buckle 61, of the snap ring 62, the outer contour of the snap ring 62 is consistent in shape with the outer contour of the lamp post 2, the first clamping groove 67 is aligned with the first groove 23, and the second clamping groove 68 is aligned with the second groove 24. Therefore, when the connector 6 is inserted into the adjacent lamp posts 2, the first clamping groove 67 correspondingly clamps the end edges, protruding from the lamp posts 2, of the adjacent circuit boards 4, and the second clamping groove 68 correspondingly clamps the edge where the adjacent light-transmitting covers 3 meet, so that the connector 6 can not only connect the adjacent lamp posts 2, but also connect the adjacent circuit boards 4 and the adjacent light-transmitting covers 3, thus ensuring the stability of the overall connection.

Preferably, the connectors 6 are symmetrically arranged up and down relative to the snap ring 62, so the same connector can be used for every two adjacent lamp posts 2, thus making it more convenient for manufacture.

Before packaging and transportation of the spliced lamp in the application, the circuit board 4 and the light-transmitting cover 3 are first installed on the lamp post 2, and then the lamp post 2 is packaged and transported, so that the packaging space can be saved. During the packaging and transportation, the lamp post 2 equipped with the circuit board 4 and the light-transmitting cover 3, the connector 6, the base 1, the connecting post 8 and the lamp cover 7 are packaged separately, so that an excessively long packaging box is not needed, the occupied space is small, packaging and transportation is more convenient, and lamp damage is also avoided by separate packaging. After the transportation in place, adjacent lamp posts 2 are connected by means of the connector 6, and the elastic buckle 61 is buckled in the through hole 21 of the lamp post 2, so that the adjacent lamp posts 2 can be connected conveniently and quickly. Meanwhile, the first clamping groove 67 of the connector 6 is clamped at the end of the circuit board 4, and the second clamping groove 68 is clamped at the edge of the light-transmitting cover 3, so that the connector 6 can not only connect the adjacent lamp posts 2, but also connect the adjacent circuit boards 4 and the adjacent light-transmitting covers 3, and ensure the stability of overall connection. Finally, the lamp post 2 is installed on the base 1 through the connecting post 8, and the lamp cover 7 is installed on the top of the lamp post 2, so that the installation of the whole lamp is realized and the operation is simple.

The above embodiments are only used to illustrate the technical solutions of the application and not used to limit the same. Although the application has been described in detail with reference to the foregoing embodiments, it should be understood by those of ordinary skill in the art that the technical solutions of the embodiments of the application may be modified or replaced equivalently, and shall fall within the scope of the claims of the application without departing from the spirit and scope of the technical solutions.

The invention claimed is:

1. A spliced lamp, comprising a plurality of lamp posts connected in sequence, wherein light-transmitting covers are arranged at the sides of the lamp posts, the light-transmitting covers being fixed to the lamp posts, a circuit board being arranged in each lamp post, a light-emitting part being arranged on the circuit board, light emitted by the light-emitting part being transmitted by the light-transmitting cover, and adjacent lamp posts being connected through a connector.

2. The spliced lamp as claimed in claim 1, wherein the connector comprises a snap ring located in the middle and a main body extending from upper and lower ends of the snap ring, the lamp post is provided with a hollow part for the main body to be inserted, and the snap ring is located between the adjacent lamp posts and is flush with the edges of the lamp posts.

3. The spliced lamp as claimed in claim 2, wherein a plurality of ribs are arranged on an outer surface of the main body in an extending direction thereof.

4. The spliced lamp as claimed in claim 2, wherein a through groove is formed in the end, close to the snap ring, of the main body, the edge of the through groove is integrally extended to form an elastic arm, a buckle is arranged at a free end of the elastic arm, through holes are formed in both ends of the lamp post, and the buckles are respectively buckled in the through holes of the adjacent lamp posts.

5. The spliced lamp as claimed in claim 4, wherein a first clamping groove and a second clamping groove are sequentially arranged at the end, away from the buckle, of the snap ring, the first clamping groove is clamped at edges of the ends of the adjacent circuit boards, and the second clamping groove is clamped at edges of the adjacent light-transmitting covers.

6. The spliced lamp as claimed in claim 5, wherein a first groove and a second groove are formed in the lamp post, the first groove is clamped at an edge of the circuit board, and the second groove is clamped at an edge of the light-transmitting cover.

7. The spliced lamp as claimed in claim 6, wherein the first clamping groove is aligned with the first groove, and the second clamping groove is aligned with the second groove.

8. The spliced lamp as claimed in claim 6, wherein the first groove and the hollow part are separated by a partition plate, and a receding groove is formed in an end of the partition plate.

9. The spliced lamp as claimed in claim 8, wherein an electrical connector is arranged at an end edge of the circuit board, the electrical connector is located in the receding groove, and when the adjacent lamp posts are spliced, the adjacent circuit boards are conducted through the electrical connector.

10. The spliced lamp as claimed in claim 1, wherein a lamp cover is arranged at the top of the uppermost lamp post, a base is arranged at the bottom of the lowermost lamp post, a connecting post is fixed on the base, and the lowermost lamp post is clamped in the connecting post.

* * * * *